Sept. 3, 1968   R. D. FAULKNER   3,399,433
CABLE CLIP

Filed March 13, 1967   2 Sheets-Sheet 1

Sept. 3, 1968  R. D. FAULKNER  3,399,433
CABLE CLIP

Filed March 13, 1967  2 Sheets-Sheet 2

United States Patent Office

3,399,433
Patented Sept. 3, 1968

3,399,433
CABLE CLIP
Reginald D. Faulkner, Mosman, New South Wales, Australia, assignor, by mesne assignments, to Trisal Clips Pty. Limited, Adamstown, New South Wales, Australia, a corporation of Australia
Filed Mar. 13, 1967, Ser. No. 622,695
3 Claims. (Cl. 24—123)

ABSTRACT OF THE DISCLOSURE

A cable clip for forming a noose in a cable which has a stopper on one end. The clip is a rigid block with two parallel grooves, one with an undercut design to hold the stopper on the end of the cable and the other groove is undercut and adapted to bind a re-entrant part of the cable when looped therein.

---

This invention relates to means for fastening cables, and more particularly to a cable clip adapted for the quick connection and release of cables.

It is known to provide a noose in a cable by splicing a free end of the cable to a region suitably spaced from said end. It is also known to provide a cable clip with a pair of tunnels, one of which permits free passage of a cable and the other of which has a restriction or land which holds some suitable upset end or stop member on the free end of a cable, so that a running noose is formed in the cable when it is looped and suitably passed through both tunnels.

However, a disadvantage of the first of these arrangements is the difficulty of working the metal elements of a heavy cable to make the splice, and a disadvantage of the second arrangement is the necessity to unthread the cable from the unrestricted tunnel of the clip in order to pass said cable through any closed-ended sheaves of pulleys which may be incorporated in a winch or crane system or the like, employing the cable.

It is an object of the present invention to overcome the above and other disadvantages, and to provide a cable clip which is capable of forming a simple, reliable noose, even in a heavy-weight cable.

According to the invention, therefore, a cable clip comprises a rigid block, a first open ended undercut groove in said block, said groove having an integral land adapted to capture and hold a stopper on the end of a cable threaded partly within said groove, and a second open-sided under-cut groove in said block running in substantially the same direction as said first groove, said second groove being adapted to bind a re-entrant part of said cable when looped therein.

One particular embodiment of the invention will now be described with reference to the accompanying drawings, in which similar reference indicate corresponding parts, and in which.

Figure 6:
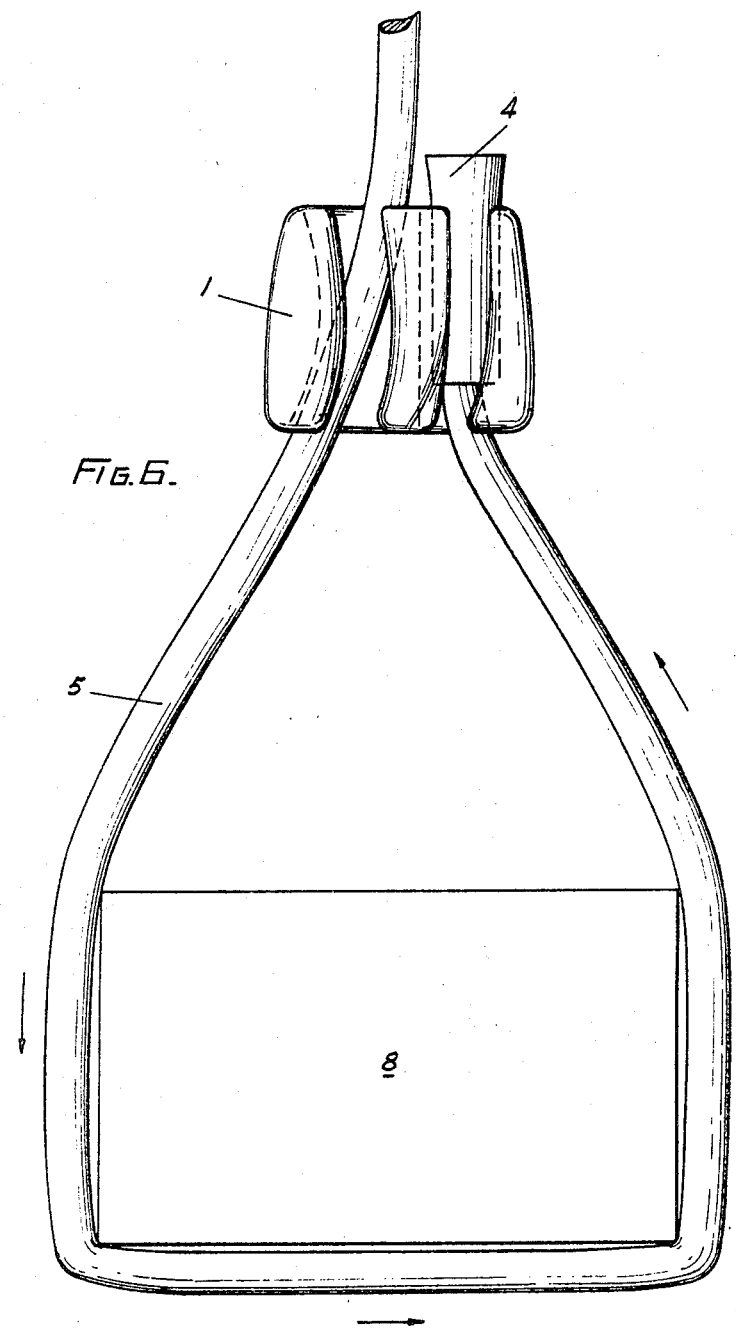
FIG. 6 shows, in front elevation, a noose formed in a cable, using the apparatus of FIGS. 1 to 5.

Upon referring to the drawings it will be seen that the block 1, which is made from any suitable material such as cast or forged steel, is provided with a first open-sided groove 2 which possesses a step or land 3 which prevents a stopper 4, swaged or other wise fastened to the end of the cable 5, from passing down through the lower part of the groove 2, although the cable itself is able to do so. A second open-sided under-cut groove 6 has a mouth 7 which is sufficiently wide to admit the cable 5 when the block 1 is pushed onto an aligned portion of said cable so as to engage it, as best shown in FIG. 6. When in the engaged position the cable tends to bight into the undercut parts of the groove 6, depending upon the alignment of the block 1 with respect to the cable, as dictated by the weight and size of a load, such as 8, which may be slung in a noose formed from the cable.

Thus, in use, the clip is first threaded onto the cable 5 until the stopper 4 engages the land 3, the end of the cable remote from the stopper then being threaded through any closed pulley sheaves, or the like, which may be associated with a crane or winch using the cable. Thereafter it is not necessary to remove the cable from any such sheaves in order to sling a load.

Figure 1:
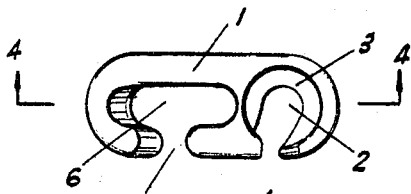
FIG. 1 shows, in plan view, a cable clip in accordance with the invention.
Figure 2:
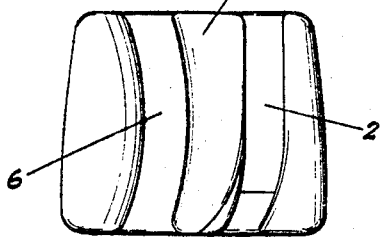
FIG. 2, shows, in front elevation, the apparatus of FIG. 1.
Figure 3:
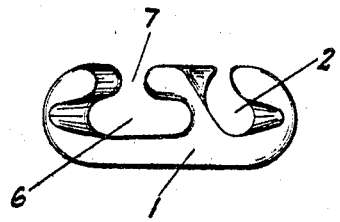
FIG. 3 shows a view from below of the apparatus of FIG. 1.
Figure 4:
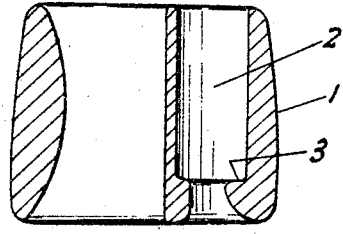
FIG. 4 shows a section along the line 4—4 of the apparatus of FIG. 1.
Figure 5:
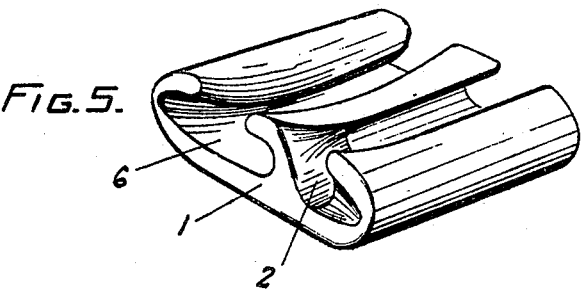
FIG. 5 shows, in perspective, on the front and bottom sides, the apparatus of FIGS. 1 to 4.

In this condition the clip may hang from the cable, ready for use, in an attitude which is the reverse of that shown in FIGS. 2 and 4. The clip 1 may then be passed beneath and around a load such as 8 in a direction as indicated by the arrows in FIG. 6, until the available slack in the cable end permits the groove 6 to be pushed into engagement with the depending part of the cable. Upon then hoisting the cable from above the level of the clip, the under-cut parts of said groove cause the clip to hold the looped cable in a safe noose after the latter has run slightly so as to properly locate the clip.

I claim:
1. A cable clip comprising a rigid block, a first open-sided under-cut groove in said block, said groove having an integral land adapter to capture and hold a stopper on the end of a cable threaded partly within said groove, and a second open-sided under-cut groove in said block running in substantially the same direction as said first groove, said second groove being adapted to bind a re-entrant part of said cable when looped therein.

2. A cable clip as claimed in claim 1, wherein the outer ends of said second groove, and also the end of said first groove adjacent to the land, are co-extensive with respective flared mouths integral with said block.

3. A cable clip as claimed in claim 2, wherein the flaring of said mouths is such that a cable, looped and bound by said clip, is directed along a path immediately outside the exits of said mouths at an angle which is sufficiently acute to permit a noose to be formed in the loop of said cable which passes between the first and second grooves of said clip.

References Cited

UNITED STATES PATENTS 1,735,691  11/1929  Morgan.

FOREIGN PATENTS 708,427  7/1941  Germany.
161,281  4/1921  Great Britain.

BERNARD A. GELAK, *Primary Examiner.*